US008656588B2

(12) United States Patent
Cho et al.

(10) Patent No.: US 8,656,588 B2
(45) Date of Patent: Feb. 25, 2014

(54) FLANGE FOR FUEL PUMP MODULE AND MANUFACTURING METHOD THEREOF

(75) Inventors: Ha Young Cho, Daejeon (KR); Jae Won Choi, Chungcheongnam-do (KR); Jin Seok Kim, Chungcheongnam-do (KR)

(73) Assignee: Coavis, Chungcheongnam-do (KR)

(*) Notice: Subject to any disclaimer, the term of this patent is extended or adjusted under 35 U.S.C. 154(b) by 271 days.

(21) Appl. No.: 13/028,661

(22) Filed: Feb. 16, 2011

(65) Prior Publication Data

US 2011/0204625 A1 Aug. 25, 2011

(30) Foreign Application Priority Data

Feb. 19, 2010 (KR) ........................ 10-2010-0015012

(51) Int. Cl.

*B23P 17/00* (2006.01)
*B29C 45/14* (2006.01)
*B31B 1/60* (2006.01)

(52) U.S. Cl.

USPC ........... 29/888.02; 29/527.2; 29/875; 156/60; 264/259; 264/274

(58) Field of Classification Search

USPC ...................... 29/527.2, 875, 888.02; 156/60; 264/259, 274; 285/405

See application file for complete search history.

(56) References Cited

U.S. PATENT DOCUMENTS

| | | | | |
|---|---|---|---|---|
| 6,812,276 | B2 * | 11/2004 | Yeager | 524/495 |
| 6,824,366 | B2 * | 11/2004 | Nagasaka et al. | 417/423.1 |
| 8,292,115 | B2 * | 10/2012 | Kobayashi et al. | 220/562 |
| 2002/0147276 | A1 * | 10/2002 | Ziebell | 525/100 |
| 2007/0190329 | A1 * | 8/2007 | Wargo et al. | 428/411.1 |
| 2011/0104470 | A1 * | 5/2011 | Anderson et al. | 428/221 |
| 2011/0168136 | A1 * | 7/2011 | Lim et al. | 123/509 |
| 2012/0111612 | A1 * | 5/2012 | Kuwahara et al. | 174/254 |
| 2012/0227887 | A1 * | 9/2012 | Auchter-Bruening | 156/60 |

FOREIGN PATENT DOCUMENTS

JP 3897829 B2 3/2007

OTHER PUBLICATIONS

Machine translation of JP8279373 (dated Oct. 22, 1996).*

* cited by examiner

*Primary Examiner* — Alexander P Taousakis
(74) *Attorney, Agent, or Firm* — The Webb Law Firm

(57) ABSTRACT

Disclosed is a flange for a fuel pump module, which includes an adhesion enhancing member so that there is no gap between a power supply terminal and a resin material for forming a flange, thus further increasing injection efficiency and sealing performance. A method of manufacturing such a flange is also provided.

1 Claim, 4 Drawing Sheets

FLANGE FOR FUEL PUMP MODULE AND MANUFACTURING METHOD THEREOF

BACKGROUND OF THE INVENTION

1. Field of the Invention

The present invention relates to a flange for a fuel pump module and a method of manufacturing the same, and more particularly, the present invention relates to a flange for a fuel pump module, which includes an adhesion enhancing member so that there is no gap between a power supply terminal and a flange forming resin material, thus further increasing injection efficiency and sealing performance, and to a method of manufacturing the same.

2. Description of the Related Art

Typically, devices such as gasoline or diesel engines which receive liquid fuel to operate vehicles and so on include a fuel tank for storing fuel, and a fuel pump module provided in the fuel tank so that fuel stored in the fuel tank is forcibly fed to the engine.

The fuel pump module is shown in FIG. 1.

The fuel pump module includes a flange assembly 1 affixed to a fuel tank, and a reservoir body assembly 2 connected to the lower surface of the flange assembly 1 by means of guide rods 3 and including a fuel filter and a fuel pump.

Specifically, the flange assembly 1 includes a feed port 11 for delivering fuel, a flange 10 having a valve seat 12 for seating a valve, a valve (not shown) provided to the valve seat 12 of the flange 10, and a power supply terminal 13 integratedly injected with the flange 10.

The power supply terminal is formed of a material having high conductivity so that a power source of an automobile is connected thereto, and thereby the fuel pump is operated. When the flange is injected, the power supply terminal may be integratedly assembled using insert molding or over-molding.

Alongside the recent use of biofuel or common rail systems, the flange which directly contacts fuel is also required to resist heat and thus is made of a plastic resin.

However, the resin having high heat resistance also has a high melting point, making it difficult to perform an injection process, and also upon cooling, drastic changes in temperature may decrease the adhesion between the power supply terminal and the resin, undesirably creating a gap between them.

In cases where the gap is created between the power supply terminal and the resin material, the fuel or gas may be discharged from the fuel tank via the gap and thus airtightness is no longer maintained.

Furthermore, from an environmental point of view, tighter restrictions are imposed on the gases discharged from vehicles, in particular, hydrocarbons.

Also, it is difficult to simply check with the naked eye whether such a gap is created, undesirably causing a deterioration in production efficiency.

SUMMARY OF THE INVENTION

Accordingly, the present invention has been made keeping in mind the problems encountered in the related art and the present invention is intended to provide a flange for a fuel pump module and a method of manufacturing the same, in which an adhesion enhancing member may be simply formed on a power supply terminal using a thermosetting adhesive tape, thus increasing the force of adhesion between the power supply terminal and a resin material for forming a flange and preventing the probability of creating a gap between them to thereby enhance sealing performance.

In particular, the present invention is intended to provide a flange for a fuel pump module and a method of manufacturing the same, in which fuel or gas may be prevented from leaking from a fuel tank, thus meeting strict exhaust gas regulations.

An aspect of the present invention provides a method of manufacturing a flange for a fuel pump module, which is integratedly injected with a power supply terminal and is affixed to a fuel tank, the method comprising manufacturing the power supply terminal, forming an adhesion enhancing member on a region of the power supply terminal which is disposed inside the flange, and performing injection molding so that the flange including the power supply terminal having the adhesion enhancing member is formed.

In this aspect, the adhesion enhancing member may be a single- or double-sided adhesive tape.

In this aspect, the adhesion enhancing member may comprise a thermosetting material, and the method may further comprise heat-hardening the adhesion enhancing member so as to increase bondability between the adhesion enhancing member and the power supply terminal, after forming the adhesion enhancing member.

In this aspect, a plastic resin material may comprise any one selected from among polyacetal (POM), polybutylenetelephthalate (PBT), polyamide (PA, nylon), polyphenylene sulfide (PPS), and polyphthalamide (PPA), and heat-hardening may be performed at 140~190° C. for 15~30 min.

Another aspect of the present invention provides a flange for a fuel pump module, manufactured using the above method.

BRIEF DESCRIPTION OF THE DRAWINGS

The features and advantages of the present invention will be more clearly understood from the following detailed description taken in conjunction with the accompanying drawings, in which.

DESCRIPTION OF THE REFERENCE NUMERALS IN THE DRAWINGS

Figure 1:
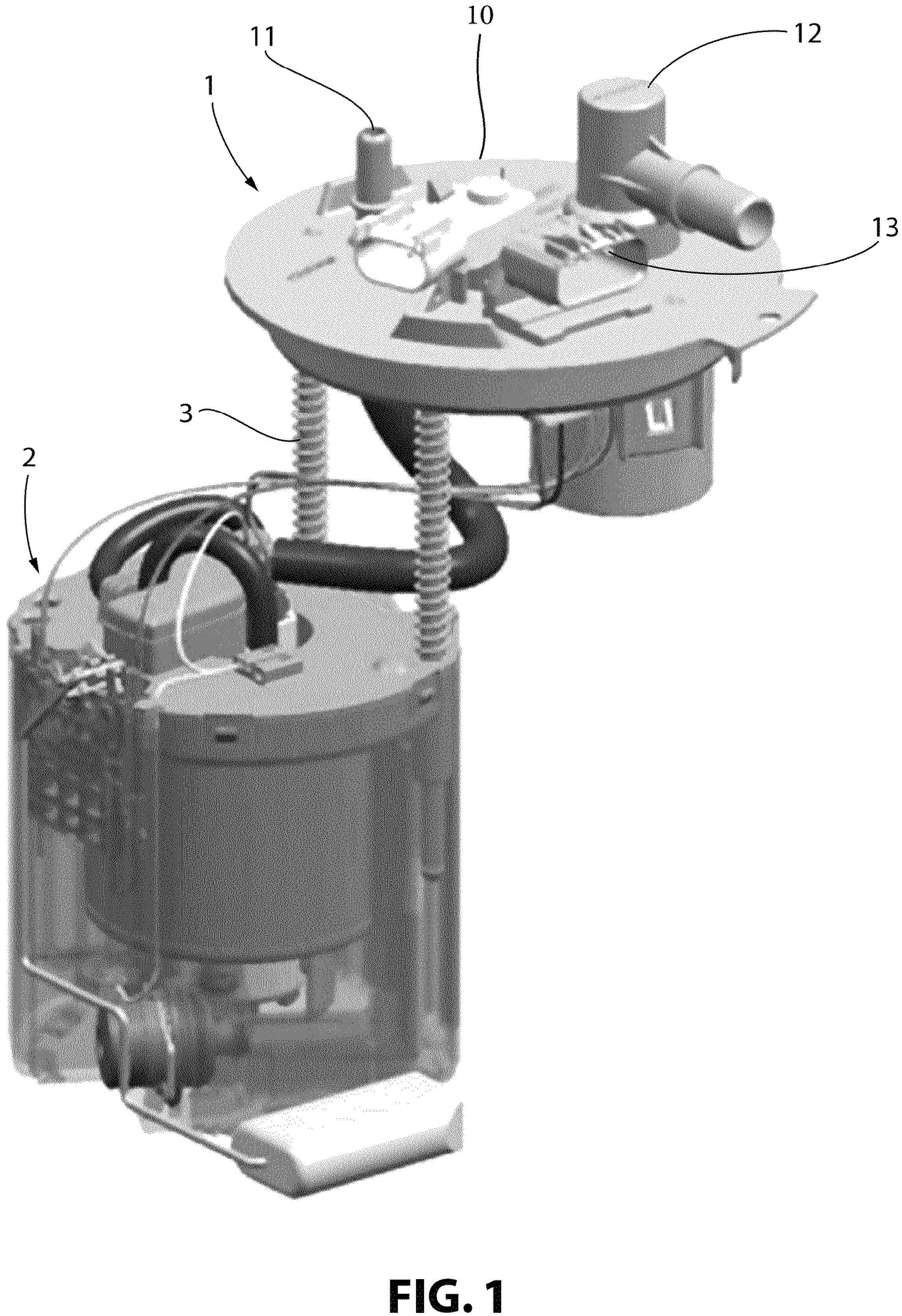
FIG. 1 is a view showing a typical fuel pump module.
Figure 2:
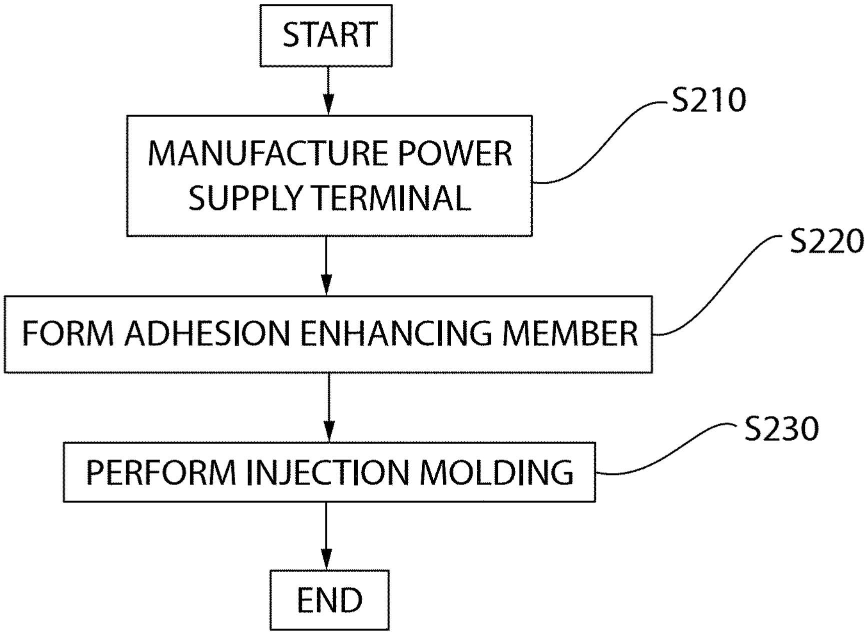
FIG. 2 is a flowchart for sequentially showing a process of manufacturing a flange for a fuel pump module according to an embodiment of the present invention.

100: flange for fuel pump module
110: power supply terminal
111: first terminal portion
112: first bent portion
113: second bent portion
114: second terminal portion
120: adhesion enhancing member
130: resin material
S210 to S240: respective steps of the process of manufacturing a flange 100 for a fuel pump module according to the present invention

DESCRIPTION OF SPECIFIC EMBODIMENTS

Hereinafter, a detailed description will be given of a flange 100 for a fuel pump module and a method of manufacturing the same according to the present invention with reference to the appended drawings.

According to the present invention, the method of manufacturing the flange 100 for a fuel pump module, which is integratedly injected with a power supply terminal 110 and is affixed to a fuel tank, includes manufacturing the power supply terminal 110 (S210), forming an adhesion enhancing member 120 (S220), and performing injection molding (S230).

In manufacturing the power supply terminal 110 (S210), the power supply terminal is manufactured using a metal having high conductivity or metal alloy.

Figure 3:
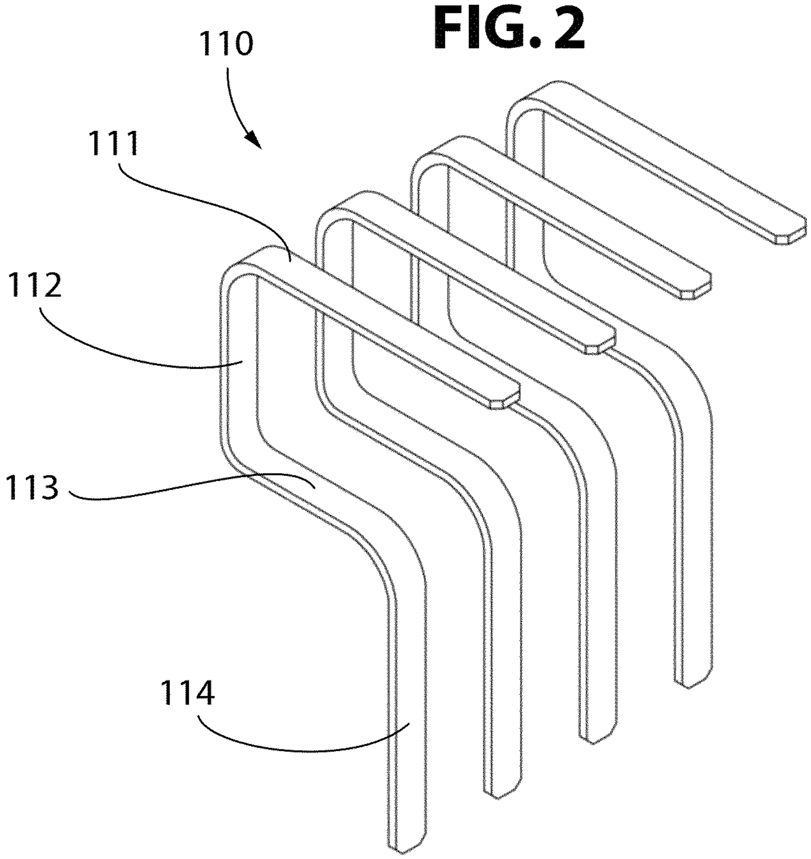
FIGS. 3 to 5 are views showing respective steps of the process of manufacturing a flange for a fuel pump module according to the present invention.

The power supply terminal 110 may be variously formed. As illustrated in FIG. 3, the power supply terminal 110 may include a first terminal portion 111 extending in a horizontal direction at one side thereof, a first bent portion 112 that is downwardly bent at one side of the first terminal portion 111 and has a predetermined height, a second bent portion 113 that is bent at a lower end of the first bent portion 112 and extends horizontally, the second bent portion 113 being integratedly formed with a resin for forming a flange 100, and a second terminal portion 114 that is downwardly bent at an end of the second bent portion 113 and has a predetermined height.

Specifically, the power supply terminal 110 is made of copper or a copper alloy, and the surface thereof is plated with any one selected from among tin, nickel, zinc, and gold so as to enhance corrosion resistance.

Figure 4:
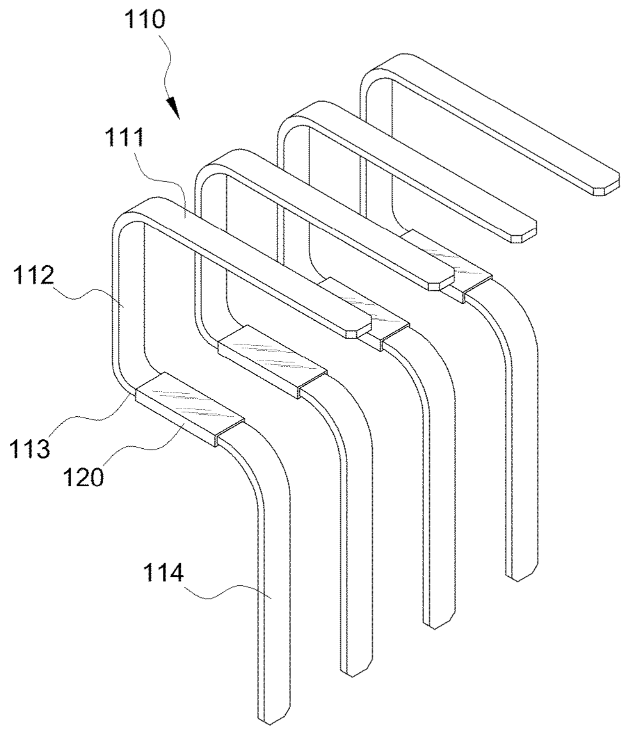

As shown in FIG. 4, in forming the adhesion enhancing member 120 (S220), the adhesion enhancing member 120 is formed on a region of the power supply terminal 110 which is disposed inside the flange 100. FIG. 4 illustrates a case where the adhesion enhancing member 120 is formed on the second bent portion 113.

The adhesion enhancing member 120 should be formed only on the region of the power supply terminal 110 which is disposed inside the flange 100, among the entire region of the power supply terminal 110. To this end, a single- or double-sided adhesive tape may be used.

The adhesion enhancing member 120 is formed of a material more resistant to high temperature compared to the resin material 130 for forming a flange 100, and thus may act as an intermediary between the power supply terminal 110 and the resin material 130, thereby enhancing the force of adhesion.

Accordingly, the method of manufacturing the flange 100 for a fuel pump module according to the present invention is advantageous because sealing performance may be increased thanks to the formation of the adhesion enhancing member 120, thus preventing the fuel or gas from leaking from the fuel tank.

The adhesion enhancing member 120 may be formed of any material so long as it is attached to the power supply terminal 110 and thus acts as an intermediary between the power supply terminal 110 and the resin material 130 so as to block the generation of the gap between them.

Specifically, the adhesion enhancing member 120 may include a thermosetting adhesive tape resulting from applying or incorporating a thermosetting adhesive material to or in non-woven cloth or paper.

The thermosetting adhesive component of the thermosetting adhesive tape may include phenol, epoxy, melamine and polyurea (urea resin). Particularly useful in the method of manufacturing a flange 100 for a fuel pump module according to the present invention may be a thermosetting adhesive tape having an epoxy based adhesive component, which has superior fuel stability and may be rapidly hardened, incorporated therein.

Figure 5:
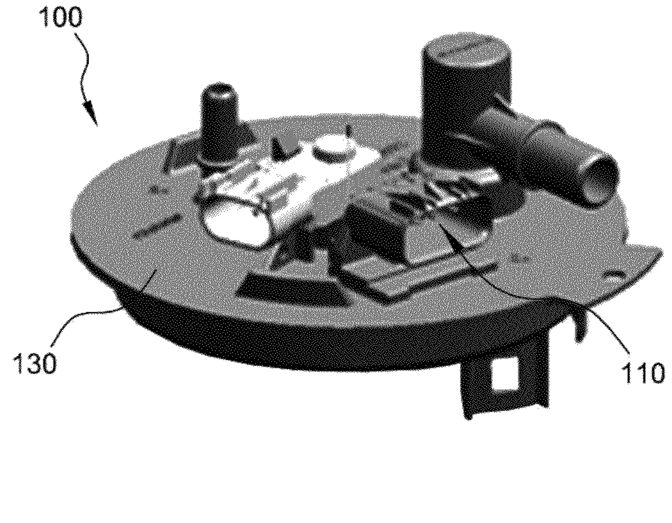

As shown in FIG. 5, in performing the injection molding (S230), the flange 100 including the power supply terminal 110 having the adhesion enhancing member 120 is formed, thereby completing the flange 100 using a plastic resin material 130.

In performing the injection molding (S230), the usable plastic resin material 130 may include any one selected from among polyacetal (POM), polybutylenetelephthalate (PBT), polyamide (PA, nylon), polyphenylene sulfide (PPS), and polyphthalamide (PPA).

In the method of manufacturing a flange 100 for a fuel pump module according to the present invention, the flange 100, which directly contacts fuel, should have high heat resistance. For this reason, the plastic resin material 130 may include a material having a melting point of 200° C. or higher. More specifically, the plastic resin material 130 may include any one selected from among POM, PBT, PA, PPS, and PPA.

However, the plastic resin material 130 having a melting point of 200° C. or higher may cause a gap to be created between the power supply terminal 110 and the resin material 130 in the course of drastically cooling the flange 100 molded at high temperature.

However, the method of manufacturing a flange 100 for a fuel pump module according to the present invention is advantageous because there is no gap between the power supply terminal 110 and the resin material 130 thanks to the use of the adhesion enhancing member 120 without generating the above problems, thus easily manufacturing the flange 100.

Figure 6:
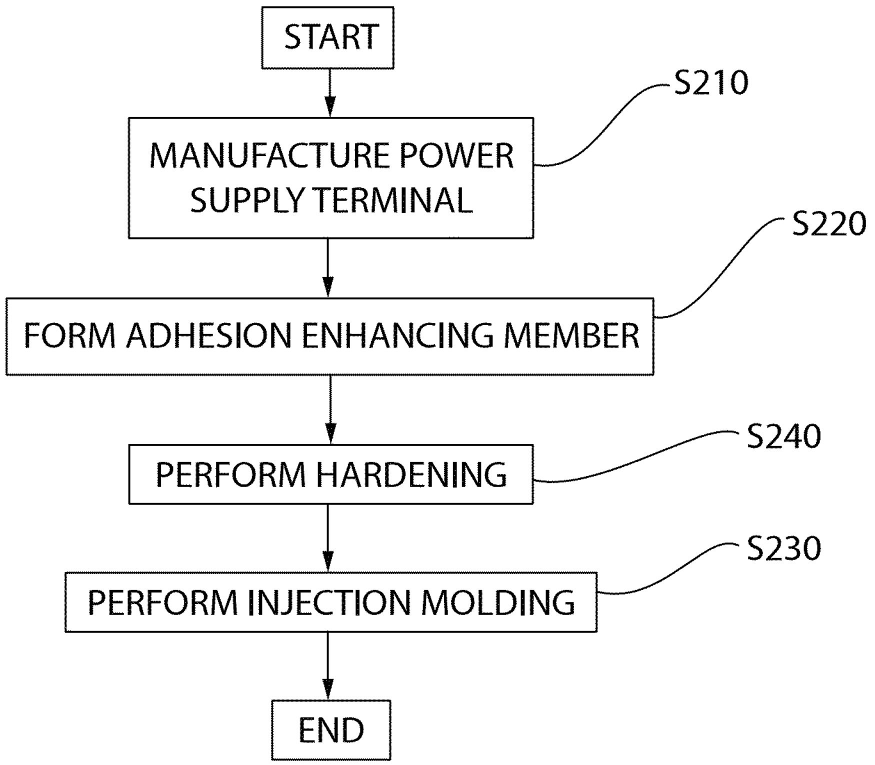
FIG. 6 is a flowchart for sequentially showing a process of manufacturing a flange for a fuel pump module according to another embodiment of the present invention.

FIG. 6 shows a process of manufacturing a flange 100 for a fuel pump module according to another embodiment of the present invention, which further includes heat-hardening the adhesion enhancing member 120 to increase bondability between the adhesion enhancing member 120 and the power supply terminal 110 (S240), after forming the adhesion enhancing member 120 (S220).

As such, the adhesion enhancing member 120 should be formed of a thermosetting material.

As used herein, the term "thermosetting" indicates a property of becoming hard and rigid when heated, to the extent of not being deformed even under a large force.

Hence, the adhesion enhancing member 120 according to the present invention is formed of a thermosetting material in order to prevent the force of adhesion of the attached adhesion enhancing member 120 from decreasing or to prevent the adhesion enhancing member 120 from being separated upon injection. This hardening (S240) may be further carried out between forming the adhesion enhancing member 120 (S220) and performing the injection molding (S230).

If the hardening (S240) is performed at a temperature lower than 140° C. or for a period of time shorter than 15 min, it may not be sufficiently carried out, making it difficult to ensure desired adhesion and sealing effects. In contrast, if the hardening is performed at a temperature higher than 190° C. or for a period of time longer than 30 min, a gap may be created in the adhesion enhancing member 120 in the subsequent injection molding (S230) because of excessive hardening. In this case, a portion of the adhesion enhancing member 120 may be separated and the separated matter may be mixed in the resin material 130 for forming a flange 100 and thus acts as an impurity.

Accordingly, the hardening (S240) is preferably performed at 140~190° C. for 15~30 min, and more preferably at 170~180° C. for 20~30 min.

The flange 100 for a fuel pump module according to the present invention is manufactured as above, and includes the adhesion enhancing member 120 is formed so that the force of adhesion between the power supply terminal 110 and the resin 130 for forming a flange 100 may be increased, and the probability of creating a gap may be prevented, thereby increasing sealing performance.

In particular, the flange 100 for a fuel pump module according to the present invention may prevent fuel or gas from leaking, thus meeting strict exhaust gas regulations.

As described hereinbefore, the present invention provides a flange for a fuel pump module and a method of manufacturing the same. According to the present invention, an adhesion enhancing member can be simply formed on a power supply terminal, thus increasing the force of adhesion between the power supply terminal and a resin material for forming a flange and preventing the probability of creating a gap between them, resulting in increased sealing performance.

Also according to the present invention, fuel or gas can be prevented from leaking, thus meeting strict exhaust gas regulations.

Also according to the present invention, the adhesion enhancing member is formed using a thermosetting adhesive tape, thus facilitating the attachment of the adhesion enhancing member to the power supply terminal, and furthermore heat is merely applied from outside, so that the force of adhesion of the adhesion enhancing member to the power supply terminal can be enhanced, thereby increasing the manufacturing efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a flange for a fuel pump module, which is injected in a state where a metal power supply terminal is inserted therein and is affixed to a fuel tank, the method comprising:

manufacturing the power supply terminal;

forming an adhesion enhancing member on a region of the power supply terminal which is disposed inside the flange;

heat-hardening the adhesion enhancing member so as to increase bondability between the adhesion enhancing member and the power supply terminal; and performing injection molding using a plastic resin material so that the flange including the power supply terminal having the adhesion enhancing member is formed, wherein the adhesion enhancing member is an adhesive tape resulting from applying or incorporating an epoxy based thermosetting adhesive material to or in non-woven cloth or paper, wherein the plastic resin material comprises any one selected from among polyacetal (POM), polybutylenetelephthalate (PBT), polyamide (PA, nylon), polyphenylene sulfide (PPS), and polyphthalamide (PPA) with a melting point of 200° C. or more, and wherein the heat-hardening is performed at temperature of 140 to 190° C. for 15 to 30 min.

* * * * *